US012773718B2

(12) United States Patent
Nash et al.

(10) Patent No.: US 12,773,718 B2
(45) Date of Patent: Oct. 27, 2026

(54) FUNCTIONALIZED TAPE FOR THE MANUFACTURE OF FIBRE-REINFORCED COMPOSITE PARTS

(71) Applicant: BAE Systems plc, London (GB)

(72) Inventors: Gregory Elliot Nash, Samlesbury (GB); Christopher Dighton, Filton Bristol (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 19/101,521

(22) PCT Filed: Jul. 28, 2023

(86) PCT No.: PCT/GB2023/052007

§ 371 (c)(1), (2) Date: Feb. 5, 2025

(87) PCT Pub. No.: WO2024/028581

PCT Pub. Date: Feb. 8, 2024

(65) Prior Publication Data

US 2025/0296113 A1 Sep. 25, 2025

(30) Foreign Application Priority Data

Aug. 5, 2022 (GB) ..................................... 2211577

(51) Int. Cl.
*B05D 1/12* (2006.01)
*C09J 7/21* (2018.01)

(52) U.S. Cl.
CPC . *B05D 1/12* (2013.01); *C09J 7/21* (2018.01)

(58) Field of Classification Search
None
See application file for complete search history.

(56) References Cited

U.S. PATENT DOCUMENTS

| | | | | |
|---|---|---|---|---|
| 2,446,387 A * | 8/1948 | Peterson | H01B 9/02 174/102 C |
| 4,234,648 A | 11/1980 | Patz | |
| 4,292,105 A | 9/1981 | Taylor | |
| 4,804,509 A | 2/1989 | Konrad | |
| 5,763,069 A | 6/1998 | Jordan | |
| 5,936,861 A | 8/1999 | Wang | |

(Continued)

FOREIGN PATENT DOCUMENTS

| | | |
|---|---|---|
| EP | 2070974 A2 | 6/2009 |
| GB | 1273159 A | 5/1972 |

(Continued)

OTHER PUBLICATIONS

Search Report for GB Application No. GB22115479.4 mail date Mar. 14, 2023, 3 pages.

(Continued)

*Primary Examiner* — Alexander M Weddle
(74) *Attorney, Agent, or Firm* — Maine Cernota & Curran

(57) ABSTRACT

A method of providing a functionalized veil or tape for manufacture of fibre-reinforced composite parts, the method comprising: depositing functional particles (12) in and/or on a veil or tape (11), by flowing F a fluid (13), through the veil or tape (11), to provide the functionalized veil or tape, wherein the veil or tape comprises reinforcement fibres and the fluid includes functional particles.

11 Claims, 2 Drawing Sheets

(56) References Cited

U.S. PATENT DOCUMENTS

| | | | |
|---|---|---|---|
| 11,213,975 B2 | 1/2022 | Nutt | |
| 2003/0017335 A1 | 1/2003 | Cermignani | |
| 2003/0017835 A1 | 1/2003 | Bergel | |
| 2005/0250002 A1 | 11/2005 | Stanley | |
| 2008/0020193 A1 | 1/2008 | Jang | |
| 2010/0096183 A1 * | 4/2010 | Rice | G01M 5/0033 156/60 |
| 2013/0248087 A1 | 9/2013 | Korzhenko | |
| 2015/0140885 A1 * | 5/2015 | Eder | H02K 3/30 427/532 |
| 2015/0211142 A1 * | 7/2015 | Thostenson | C03C 25/44 428/327 |
| 2017/0165875 A1 * | 6/2017 | Gaillard | B29B 15/122 |
| 2018/0208729 A1 | 7/2018 | Kurokawa | |

FOREIGN PATENT DOCUMENTS

| | | | |
|---|---|---|---|
| JP | 2013107253 | A | 6/2013 |
| JP | 2025525957 | A | 8/2025 |
| WO | 9215404 | A1 | 9/1992 |
| WO | 2012091897 | A1 | 7/2012 |
| WO | 2014011293 | A2 | 1/2014 |
| WO | 2015017553 | A1 | 2/2015 |
| WO | 2018173618 | A1 | 9/2018 |

OTHER PUBLICATIONS

Search Report for GB Application No. GB2211577.8 mail date Mar. 14, 2023, 3 pages.

International Search Report and Written Opinion for International Application No. PCT/GB2023/052006 mail date Nov. 29, 2023, 10 pages.

International Search Report and Written Opinion for International Application No. PCT/GB2023/052007 mail date Dec. 4, 2023, 11 pages.

Office Action for U.S. Appl. No. 18/994,820, mail date Aug. 14, 2026, 34 Pages.

* cited by examiner

FUNCTIONALIZED TAPE FOR THE MANUFACTURE OF FIBRE-REINFORCED COMPOSITE PARTS

RELATED APPLICATIONS

This application is a national phase application filed under 35 USC § 371 of PCT Application No. PCT/GB2023/052007 with an International filing date of Jul. 28, 2023, which claims priority of GB Patent Application 2211577.8 filed Aug. 5, 2022. Both of these applications are incorporated herein by reference in their entirety for all purposes.

FIELD

This invention relates to veils or tapes, comprising reinforcement fibres, for manufacture of fibre-reinforced composite parts, particularly to functionalized veils or tapes, comprising reinforcement fibres, for manufacture of fibre-reinforced composite parts.

BACKGROUND

Automated layup for fibre-reinforced composites, for example by automated tape laying (ATL) and automated fibre placement (AFP), typically involves laying fibre tapes, fabrics or tows onto moulds, using robots or CNC machines, for example. The tapes, fabrics and tows may be binder infused or resin impregnated (also known as pre-pregs). Layup for fibre-reinforced composite parts may be accelerated by laying multiple courses concurrently, laying multiple tapes, fabrics or tows simultaneously and/or by increasing the width of the tapes, fabrics or tows. ATL typically uses tapes having relatively wider widths of 2, 3, 6, 12 or 24 inch (nominally 51, 76, 152, 305, or 610 mm) while AFP typically uses tows (also known as ribbons) having relatively narrower widths of ⅛, ¼, ½ or 1 inch (3.17, 6.35, 12.7 or 25.4 mm), though there is the drive to further increase the width of tows to 1.5 inches (38.1 mm). The selection of widths of the tapes, fabrics or tows is typically limited by part curvature in two or three dimensions.

Functionalized veils or tapes (including functionally-graded veils or tapes) may be used to transition between two different fibre-reinforced composite parts having different properties, for example having different dielectric properties. By grading (also known as graduating or tapering) the functional additives and/or functional layers, the properties may be varied across a width and/or along a length of the functional tapes. For example, a taper in electrical conductivity is required to enable a dielectric component (for example, a radome) to be integrated with a carbon fibre structural component of an airframe.

Conventional methods of providing functionalized veils or tapes, comprising reinforcement fibres, for manufacture of fibre-reinforced composite parts are relatively complex, costly and/or energy intensive. For example, conventional methods of providing functionally-graded veils or tapes having resistive tapers rely on sputtering of conductive particles onto a veil or tape that is then integrated into a ply layup.

Hence, there is a need to improve the manufacture of functionalized veils or tapes, comprising reinforcement fibres, for manufacture of fibre-reinforced composite parts.

SUMMARY

A first aspect provides a method of providing a functionalized veil or tape (more generally, a membrane) for manufacture of fibre-reinforced composite parts, the method comprising:

depositing functional particles in and/or on a veil or tape by flowing a fluid through the veil or tape, to provide the functionalized veil or tape, wherein:

the veil or tape comprises reinforcement fibres; and the fluid includes functional particles.

In this way, the functionalized veil or tape may be used to transition between two different fibre-reinforced composite parts having different properties, for example having different dielectric properties. For example, a taper in electrical conductivity is required to enable a dielectric component (for example, a radome) to be integrated with a carbon fibre structural component of an airframe. Other applications include EMI/RFI shielding, lightning strike protection, tailored functionality. In contrast with conventional methods of providing functionalized veils or tapes, comprising reinforcement fibres, for manufacture of fibre-reinforced composite parts, the method according to the first aspect is relatively simple, inexpensive and/or not energy intensive since the functional particles are deposited in and/or on a veil or tape by flowing the fluid, including the functional particles, through the veil or tape, to provide the functionalized veil or tape. Particularly, the method according to the first aspect allows for a resistive taper in one singular ply, thus reducing the complexity and features required at various points in the fibre-reinforced composite parts, e.g. airframes. For example, by non-uniformly depositing the functional particles in and/or on the veil or tape, such as by graduating deposition, patterning and/or masking of the functional particles, heterogeneous deposition of the functional particles is provided, thereby providing graded or patterned properties, such as electrical, thermal, magnetic and/or structural properties, of the veil or tape. In other words, such properties of the veil or tape are tailored or customised, such as to a taper in electrical conductivity to enable a dielectric component (for example, a radome) to be integrated with a carbon fibre structural component of an airframe. For example, the method according to the first aspect allows variable properties, e.g. conductivity, across a single reel of material while the method may be altered in-line, allowing bespoke reels to be produced.

It should be understood that the fluid comprises and/or is a carrier fluid, for carrying the functional particles. Generally, carrier fluids are inert and hence do not react with the functional particles. Additionally and/or alternatively, the fluid comprises and/or is a reactive fluid, for reacting with (for example functionalizing) the functional particles and/or the reinforcement fibres, such as to initiate or participate in a reaction between the functional particles and the reinforcement fibres, to improve bonding or binding therebetween. It should be understood that the veil or tape is permeable with respect to the fluid but at most semi-permeable with respect to the functional particles, thereby depositing at least some of the functional particles therein and/or thereon, for example on the reinforcement fibres and/or in pores therebetween.

Generally, veils are highly porous, nonwoven membranes or sheets, produced from short chopped reinforcement fibres and may be used as a surface layer on a fibre-reinforced composite part. Generally, tapes are woven and/or braided continuous fibres or provided by spreading one or more tows, for example. ATL typically uses tapes having relatively wider widths of 2, 3, 6, 12 or 24 inch (nominally 51, 76, 152, 305, or 610 mm) while AFP typically uses tows (also known as ribbons) having relatively narrower widths of ⅛, ¼, ½ or 1 inch (3.17, 6.35, 12.7 or 25.4 mm), though there is the drive to further increase the width of tows to 1.5 inches (38.1 mm). Generally, sheets are non-woven chopped fibres or woven and/or braided continuous fibres, having relatively wider widths. Generally, tows are bundles (i.e. neither braided nor woven) of continuous fibres.

In one example, the fluid comprises and/or is a gas, for example air or an inert gas, for example nitrogen, and/or a reactive gas, for example hydrogen, such as contained in a chamber. In this way, the gas, including the functional particles such as dispersed or entrained therein, flows through the veil or tape, for example by pumping the gas therethrough.

In one example, the fluid comprises and/or is a liquid, for example an organic solvent, such as acetone and/or propan-2-ol, and/or a polar and/or non-polar solvent, such as contained in a tank. Non-polar solvents may be preferred, to reduce and/or avoid water contamination of the veil or tape. In this way, the liquid, including the functional particles such as dispersed, entrained or suspended therein, flows through the veil or tape, for example by pumping the liquid therethrough.

In one example, flowing the fluid, including the functional particles, through the veil or tape, comprises flowing the fluid, including the functional particles, through the veil or tape using a fluidized bed.

It should be understood that the functional particles have the required electrical, thermal, magnetic and/or structural properties to provide desired respective properties of the pre-impregnated tape for the fibre-reinforced composite parts. In one example, the functional particles comprise and/or are electrically conductive particles, for example metal particles such as Au, Ag, Ni, Cu, Al and/or non-metal particles such as graphene, reduced graphene oxide, conductive oxides. In one example, the functional particles comprise and/or are nanoparticles, microparticles, nanowires, nanosheets, flakes.

In one example, the metal is a transition metal, for example a first row, a second row or a third row transition metal. In one example, the metal is Sc, Ti, V, Cr, Mn, Fe, Co, Ni, Cu or Zn. In one example, the metal is Y, Zr, Nb, Mo, Tc, Ru, Rh, Pd, Ag or Cd. In one example, the metal is Hf, Ta, W, Re, Os, Ir, Pt, Au or Hg. In one example, the metal is a lanthanide. In one example, the metal is La, Ce, Pr, Nd, Pm, Sm, Eu, Gd, Tb, Dy, Ho, Er, Tm, Yb or Lu. In one example, the metal is an actinide. In one example, the metal is Ac, Th, Pa, U, Np, Pu, Am, Cm, Bk, Cf or Es.

Generally, the functional particles comprise a metal, for example a pure or unalloyed metal or an alloy thereof, may comprise any metal amenable to fusion by melting. Generally, the functional particles comprise a metal, for example a pure metal or an alloy, may comprise any metal from particles, for example powder particles, may be produced by atomisation.

These functional particles may be produced by atomisation, such as gas atomisation or water atomisation, or other processes known in the art.

In one example, the functional particles comprise an inorganic compound. Inorganic compounds such as ceramics comprising the functional metal may include, for example, oxides, silicates, sulphides, sulphates, halides, carbonates, phosphates, nitrides, borides, hydroxides of the metal. These inorganic compounds may include a second such metal, for example, mixed oxides such as a mixture of barium titanate and strontium titanate such as (Ba, Sr)$TiO_3$. The functional particles may comprise TCP (tricalciumphosphate), MCP (monocalciumphosphate), DCP (dicalciumphosphate), tetracalciumphosphate, hydroxylapatite, alpha-TCP, beta-TCP, titanium oxide (fitania), aluminium oxide (alumina), zirconium oxide (zirconia), yttrium oxide (yttria), yttria stabilized zirconia, indium oxide, indium tin oxide, boron nitride, silicon carbide, boron carbide, tungsten carbide, beryllium oxide, zeolite, cerium oxide (ceria), tungsten disilicide, sodium silicide, platinium silicide, zirconium nitride, tungsten nitride, vanadium nitride, tantalum nitride, niobium nitride, silicon boride, barium titanate, lead zirconate titanate, zinc oxide, potassium niobate, lithium niobate, sodium tungstate, sodium chloride, sodium nitrate, potassium nitrate, potassium chloride, magnesium chloride, calcium chloride, calcium nitrate, magnesium nitrate, strontium oxide, strontium phosphate, strontium titanate, calcium sulfate, barium sulfate, calcium carbonate, sodium carbonate and/or sodium fluoride or mixtures thereof.

Preferably, the functional particles comprise a transition metal and/or an oxide thereof.

The functional particles may have regular, such as spherical, cuboidal or rod, shapes and/or irregular, such as spheroidal, flake or granular, shapes (also known as morphologies).

The inventors have identified that a size, for example the diameter, of the functional particles (or a largest dimension of an agglomerate) may affect dispersion thereof in the fluid and/or in and/or on the veil or tape. Non-uniform dispersion in the fluid may result in undesired inhomogeneity in the functionalized veil or tape. Such undesired inhomogeneity in the functionalized veil or tape may be unsuitable for the functionalized veil or tape. Relatively small particles may adversely affect viscosity. Relatively large particles may result in blockages.

At least 50% by weight of the functional particles may have a diameter of at most 100 nm. For regular shapes, the diameter may refer to the diameter of a sphere or a rod, for example, or to the side of a cuboid. The diameter may also refer to the length of the rod. For irregular shapes, the diameter may refer to a largest dimension, for example, of the particles. Suitably, the particle size distribution is measured by use of light scattering measurement of the particles in an apparatus such as a Malvern Mastersizer 3000, arranged to measure particle sizes from 10 nm to 3500 micrometres, with the particles wet-dispersed in a suitable carrier liquid (along with a suitable dispersant compatible with the particle surface chemistry and the chemical nature of the liquid) in accordance with the equipment manufacturer's instructions and assuming that the particles are of uniform density.

In one example, the additive particles comprise and/or are nanoparticles, having a diameter in a range from 1 nm to 100 nm, preferably in a range from 10 nm to 90 nm, more preferably in a range from 15 nm to 85 nm, most preferably in a range from 25 nm to 75 nm, for example 50 nm. In one example, the additive particles comprises and/or are nanoparticles, wherein at least 50% by weight of the nanoparticles have a diameter in a range from 1 nm to 100 nm, preferably in a range from 10 nm to 90 nm, more preferably in a range from 15 nm to 85 nm, most preferably in a range from 25 nm to 75 nm, for example 50 nm. In one example, the additive particles comprises and/or are nanoparticles, wherein at least 90% by weight of the nanoparticles have a diameter in a range from 1 nm to 100 nm, preferably in a range from 10 nm to 90 nm, more preferably in a range from 15 nm to 85 nm, most preferably in a range from 25 nm to 75 nm, for example 50 nm. In one example, the additive particles comprises and/or are nanoparticles, wherein at least 95% by weight of the nanoparticles have a diameter in a range from 1 nm to 100 nm, preferably in a range from 10 nm to 90 nm, more preferably in a range from 15 nm to 85 nm, most preferably in a range from 25 nm to 75 nm, for example 50 nm. In one example, the additive particles comprises and/or are nanoparticles, wherein at least 99% by weight of the nanoparticles have a diameter in a range from 1 nm to 100 nm, preferably in a range from 10 nm to 90 nm, more preferably in a range from 15 nm to 85 nm, most preferably in a range from 25 nm to 75 nm, for example 50 nm.

Particles of these sizes may be termed nanoparticles. Generally, nanoparticles tend to agglomerate, to reduce surface energy. Agglomerates are an assembly of a variable number of the particles and the agglomerates may change in the number of particles and/or shape, for example. Nanopowders are solid powders of nanoparticles, often containing micron-sized nanoparticle agglomerates. These agglomerates may be redispersed (at least to some extent) in the solid state using, for example, ultrasonic processing. Nanoparticle dispersions are suspensions of nanoparticles in a liquid carrier, for example water or organic solvent/organic matrix. Agglomeration may depend, for example, on temperature, pressure, pH-value, and/or viscosity. Agglomeration of the particles may result in non-uniform dispersion of the particles in the fluid. Hence, a suitable particle size may be also a balance between reducing agglomeration while avoiding blockages in use, all while achieving a uniform dispersion and desired distribution on and/or in the functionalized veil or tape. Furthermore, a form of the particles (nanopowder or suspension) may affect dispersion in the fluid.

In one example, the additive particles comprise and/or are microparticles, having a diameter in a range from 1 μm to 1000 μm, preferably in a range from 100 μm to 900 μm, more preferably in a range from 150 μm to 850 μm, most preferably in a range from 250 μm to 750 μm, for example 500 μm. In one example, the additive particles comprises and/or are microparticles, wherein at least 50% by weight of the microparticles have a diameter in a range from 10 μm to 1000 μm, preferably in a range from 100 μm to 900 μm, more preferably in a range from 150 μm to 850 μm, most preferably in a range from 250 μm to 750 μm, for example 500 μm. In one example, the additive particles comprises and/or are microparticles, wherein at least 90% by weight of the microparticles have a diameter in a range from 10 μm to 1000 μm, preferably in a range from 100 μm to 900 μm, more preferably in a range from 150 μm to 850 μm, most preferably in a range from 250 μm to 750 μm, for example 500 μm. In one example, the additive particles comprises and/or are microparticles, wherein at least 95% by weight of the microparticles have a diameter in a range from 10 μm to 1000 μm, preferably in a range from 100 μm to 900 μm, more preferably in a range from 150 μm to 850 μm, most preferably in a range from 250 μm to 750 μm, for example 500 μm. In one example, the additive particles comprises and/or are microparticles, wherein at least 99% by weight of the microparticles have a diameter in a range from 10 μm to 1000 μm, preferably in a range from 100 μm to 900 μm, more preferably in a range from 150 μm to 850 μm, most preferably in a range from 250 μm to 750 μm, for example 500 μm.

In one example, the additive particles comprise and/or are nanoparticles and microparticles, as described previously. In one example, the additive particles comprise microparticles in a range from 1% to 99%, preferably in a range from 10% to 90%, more preferably in a range from 25% to 75% by weight of the particles and nanoparticles in a range from 99% to 1%, preferably in a range from 90% to 10%, more preferably in a range from 75% to 25% by weight of the particles, for example balance nanoparticles. In one example, the additive particles consist of nanoparticles and microparticles, as described previously.

It should be understood that the reinforcement fibres provide a substrate for the functional particles and may be the same as or different from reinforcement particles of the fibre-reinforced composite part. It should be understood that a veil comprises and/or is a non-woven sheet comprising non-oriented, typically chopped, reinforcement fibres, having a relatively lower specific mass (i.e. mass per unit area) than a tape and/or a relatively lower thickness than a tape. In one example, the reinforcement fibres comprise and/or are electrically insulating reinforcement fibres. In one preferred example, the reinforcement fibres comprise and/or are electrically insulating reinforcement fibres and the functional particles comprise and/or are electrically conductive particles. In this way, the electrical properties of the veil or tape may be graduated (e.g. tapered) or patterned, for example across a width and/or along a length thereof, to transition between fibre-reinforced composite parts having different properties, for example having different dielectric properties, as described previously.

In one example, the reinforcement fibres comprise and/or are electrically conductive reinforcement fibres. In one preferred example, the reinforcement fibres comprise and/or are electrically conductive reinforcement fibres and the functional particles comprise and/or are electrically insulating particles. In this way, the electrical properties of the veil or tape may be graduated (e.g. tapered) or patterned, for example across a width and/or along a length thereof, to transition between fibre-reinforced composite parts having different properties, for example having different dielectric properties, as described previously.

In one example, the reinforcement fibres comprise non-metal fibres for example glass fibres such as A-glass, E-glass, E-CR-glass, C-glass, D-glass, R-glass, S-glass, S-2-glass and HS-glass; carbon fibres such as aerospace or industrial grades of IM2A, IM2C, IM5, IM6, IM7, IM8, IM9, IM10, AS4, AS4A, AS4C, AS4D, AS7, HM50 and HM63; aramid fibres such as Kevlar®, Nomex® and Technora®; Ultra-High Molecular Weight Polyethylene (UHMwPE) fibres such as Dyneema®; basalt fibres such as Basfiber® or Wiking® Super B; and/or mixtures thereof. In one example, the reinforcement fibres comprise metal and/or alloy fibres for example titanium, aluminium and/or copper and/or alloys thereof; stainless steel fibres; and/or mixtures thereof. In one example, the reinforcement fibres comprise a mixture of non-metal and metal fibres.

In one example, reinforcement fibres have a diameter in a range from 2 μm to 100 μm, preferably in a range from 4 μm to 50 μm, more preferably in a range from 5 μm to 20 μm, most preferably in a range from 6 μm to 10 μm, for example 6 μm, 7 μm, 8 μm, 9 μm or 10 μm. Typically, suitable carbon fibres have a diameter in a range from 5 μm to 10 μm and suitable glass fibres have a diameter in a range from 4 μm to 20 μm.

In one example, a volume fraction $V_f$ of the reinforcement fibres is in a range from 50% to 100%, preferably in a range from 60% to 95%, for example 70%, 80% or 90%, by volume of the veil or tape. In this way, a relatively high volume fraction $V_f$ of the reinforcement fibres in the veil or tape may be provided.

In one example, a volume fraction $V_f$ of the reinforcement fibres is in a range from 30% to 90%, preferably in a range from 40% to 80%, more preferably in a range from 40% to 70%, for example 40%, 45%, 50%, 55%, 60%, 65% or 70% by volume of the fibre-reinforced composite parts. It should be understood that generally, the volume fraction $V_m$ of the matrix, for example the first polymeric composition, is related to the volume fraction $V_f$ of the reinforcement fibres, for example the first set of reinforcement fibres, by $V_f+V_m=1$. In this way, a relatively high volume fraction $V_f$ of the reinforcement fibres in the fibre-reinforced composite parts may be provided.

In one example, the tape comprises aligned and/or continuous reinforcement fibres, for example woven and/or braided continuous fibres. In one example, the reinforcement fibres have a length of at least 2 mm, preferably at least 10 cm, more preferably at least 1 m, most preferably at least 10 m. It should be understood that the length of the reinforcement fibres is a total length of each reinforcement fibre. That is, the reinforcement fibres may comprise and/or are continuous fibres.

In one example, the veil comprises non-aligned and/or discontinuous reinforcement fibres, for example chopped fibres such as a mat thereof. In contrast to continuous fibres, chopped fibres typically have lengths less than 3 mm and tend to be arranged randomly or less than perfectly aligned.

In one example, depositing the functional particles in and/or on the veil or tape comprises non-uniformly depositing the functional particles in and/or on the veil or tape. In this way, depositing the functional particles in and/or on the veil or tape is controlled. In this way, the functional particles are deposited heterogeneously in and/or on the veil or tape, thereby controlling properties of the veil or tape, as described previously. It should be understood that non-uniformly depositing the functional particles in and/or on the veil or tape provides a non-uniform distribution of the deposited functional particles across a width and/or along a length of the veil or tape, such that a content (i.e. concentration, level, amount) of the deposited functional particles varies across the width and/or along the length of the veil or tape, for example according to a pre-determined non-uniform distribution or pattern (i.e. controlled c.f. random), for example varying by a factor of at least 2, 3, 4, 5, 6, 7, 8, 9, 10, 20, 30, 40, 50, 60, 70, 80, 90, 100 or more across the width and/or along the length of the veil or tape. In contrast, uniformly depositing the functional particles in and/or on the veil or tape provides a uniform distribution of the deposited functional particles across a width and/or along a length of the veil or tape, such that a content (i.e. concentration, level, amount) of the deposited functional particles varies across the width and/or along the length of the veil or tape, for example by a factor of at most 2, 1.75, 1.5, 1.25, 1.1, 1.05 or less across the width and/or along the length of the veil or tape.

In one example, non-uniformly depositing the functional particles in and/or on the veil or tape comprises non-uniformly depositing the functional particles in and/or on the veil or tape across a width and/or a length thereof. In this way, the properties of the veil or tape may be graded (e.g. graduated or tapered, for example linearly or non-linearly) or patterned (for example periodically or non-periodically), for example across a width and/or along a length thereof, to transition between fibre-reinforced composite parts having different properties, as described previously.

In one example, non-uniformly depositing the functional particles in and/or on the veil or tape comprises depositing the functional particles in and/or on a periphery (i.e. edges), for example only in and/or on a periphery, of the veil or tape, for example for a printed circuit board (PCB).

In one example, non-uniformly depositing the functional particles in and/or on the veil or tape comprises masking (also known as patterning) the veil or tape, for example using a mask (also known as a pattern). In this way, the functional particles are deposited corresponding to the mask. In one example, masking the veil or tape comprises disposing a mask upstream (i.e. with respect to the flowing fluid) of the veil or tape, for example proximal to, confronting or contacting the veil or tape. In this way, fidelity of the correspondence of the deposited functional particles with respect to the mask is improved. In one example, masking the veil or tape comprises disposing a mask downstream (i.e. with respect to the flowing fluid) of the veil or tape, for example proximal to, confronting or contacting the veil or tape. In this way, graduation of the deposited functional particles with respect to the mask is attenuated, thereby smoothly (c.f. abruptly) transitioning a content of the deposited functional particles on and/or in the veil or tape.

In one example, depositing the functional particles in and/or on the veil or tape comprises applying a magnetic field and/or an electric field while flowing the fluid including functional particles through the veil or tape. In this way, depositing the functional particles in and/or on the veil or tape is further controlled. In one example, applying the magnetic field and/or the electric field while flowing the fluid including functional particles through the veil or tape comprises applying the magnetic field and/or the electric field parallel with or transversely to the flowing fluid. Additionally and/or alternatively, depositing the functional particles in and/or on the veil or tape comprises applying a magnetic field and/or an electric field without flowing the fluid (for example, in a static tank or chamber) whereby the functional particles are urged towards and deposited on the veil or tape by the applied magnetic field and/or the applied electric field.

In one example, depositing the functional particles in and/or on the veil or tape comprises depositing the functional particles on the reinforcement fibres and/or in pores therebetween.

In one example, the method comprises reacting the functional particles. In this way, the functional particles are deposited in and/or on the veil or tape and subsequently reacted. In one example, the method comprises functionalizing the functional particles. In this way, non-functionalized particles are deposited in and/or on the veil or tape and subsequently functionalized. For example, metal oxide particles may be reduced to metal particles.

In one example, the method comprises dispersing and/or suspending the functionalized particles in the fluid, for example in a gas or a liquid, as described previously.

In one example, flowing the fluid including the functional particles through the veil or tape, comprising the reinforcement fibres, comprises applying a pressure differential (i.e. a difference in pressure through a thickness of the veil or tape, sufficient to cause the fluid to flow therethrough, for example due to pumping and/or osmotic pressure differential) of the fluid through the veil or tape, for example in a chamber or bath. In this way, flowing the fluid including the functional particles through the veil or tape is urged by the applied pressure differential of the fluid through the veil or tape. In one example, applying the pressure differential of the fluid through the veil or tape comprises pumping the fluid through the veil or tape, for example using a pump.

In one example, flowing the fluid including the functional particles through the veil or tape, comprising the reinforcement fibres, comprises orienting the veil or tape relative to the flowing fluid, for example at an angle thereto. In this way, a non-uniform distribution of the deposited functional particles across a width and/or along a length of the veil or tape is provided.

In one example, the reinforcement fibres are surrounded, at least in part, with a first polymeric composition, for example when the veil or tape is a pre-preg. In this way, handling of the veil or tape is improved. In one example, the veil or tape is a pre-impregnated veil or tape. In one example, the veil or tape is dry i.e. not surrounded, at least in part, with the first polymeric composition.

Generally, pre-preg is "pre-impregnated" reinforcement fibres where a thermoset polymer matrix material, such as an epoxy, or a thermoplastic resin matrix is already present. The fibres may take the form of a weave and the matrix is used to bond the fibres together and to other components during manufacture. The thermoset matrix is only partially cured to allow easy handling; this B-Stage material requires cold storage to prevent complete curing. B-Stage pre-preg is always stored in cooled areas since heat accelerates complete polymerization.

Thermoplastic matrices do not require such cold-storage. Hence, composite structures built of pre-pregs will mostly require an oven or autoclave to cure. Pre-preg allows impregnation of the fibres on a flat surface, for example, and then later, laying of the impregnated fibres to provide a desired shape, which could be otherwise problematic to lay without the matrix.

Thermoplastic prepregs may be provided in unidirectional tape, or in fabrics that are woven or stitched, for example.

In one example, the first polymeric composition comprises a first thermoplastic, selected from a group comprising acrylonitrile butadiene styrene (ABS), polylactic acid (PLA), polycarbonate (PC), polyamide (PA), polystyrene (PS), high-density polyethylene (HDPE), PC/ABS, polyethylene terephthalate (PETG), polyphenylsulfone (PPSU), high impact polystyrene (HIPS), polytetrafluoroethylene (PTFE), lignin, rubber, and/or a polyaryletherketone (PAEK), such as polyetherketoneketone (PEKK), polyetheretherketone (PEEK) and polyetherimide (PEI). In one example, the first thermoplastic comprises, consists of and/or is PEKK, PEEK and/or PEI, preferably PEKK and/or PEEK, more preferably PEKK. Compared with PEEK, a PEKK is more robust (i.e. less sensitive) to cooling rate, due, at least in part, to a wider range of acceptable crystallinity.

In one example, the first polymeric composition comprises a reactive thermoplastic resin, such as Elium®. Elium is a liquid monomer that may be processed like a thermoset but upon reaction, transforms into a thermoplastic which may be subsequently thermoformed, melted and/or welded. Anionic polymerization of caprolactam (a monomer of polyamide-6, PA-6) is also suitable. Generally, reactive thermoplastic resins may be cured after laying, for example by heating and/or using a catalyst included in the first polymeric composition, thereby reacting molecules thereof to provide a thermoplastic having improved mechanical properties.

In one example, the first polymeric composition comprises a second thermoplastic, as described above with respect to the first thermoplastic (i.e. a copolymer).

In one example, the first polymeric composition comprises a thermoset, for example an epoxy, benzoxazine, bis-maleimides (BMI), polyimide, polyurethane, silicone, vinyl, amino, furan, phenolic and/or cyanate ester resin, and optionally a hardener.

Selection of an appropriate first polymeric composition for the reinforcement fibres is known.

In one example, the method comprises drawing, for example continuously, a porous/semi-permeable veil or tape across an angled pressure differential, whereby the enforced/entrained motion of the functional particles is unevenly distributed across the width of the veil or tape. This may be performed by setting the distance and/or location of a pump or vacuum source on one side of the veil or tape—in order to induce a stronger flow in a particular location along the width.

In one example, the method comprises altering and/or controlling an angle (i.e. an orientation) at which the veil or tape is brought over a pump or vacuum source, in order to make use of the pumping direction and/or gravity to assist in distributing the particles (particularly, but not limited to, colloids) towards the lower end of the veil (relative to flat). In one example, the angle (i.e. between the veil or tape and the direction of flow of the fluid) is in a range from 5° to 85°, preferably in a range from 15° to 75°, more preferably in a range from 30° to 60°, for example 45°.

In both of these methods, successive plugging of pores in the veil or tape can be taken advantage of, as the veil or tape now is not uniform in its porosity/permeability (and path-through size/collective pore size/channel widths are significantly changed) and will therefore behave differently as a 'filtration medium'; this is useful for further passes of the above processes and/or depositing particles that (wouldn't plug/undesirable distribution) as the initially-processed veil or tape and its deposited particles can influence the further deposition through changing the pore characteristics (size, number-both of these affecting flow) as well as influences arising from the properties (or mere presence) of the deposited particles (i.e. magnetic attraction, chemical reaction, viscosity effects such as skin forming or beading—to affect surface finish, for instance). These influences could be taken advantage of for further affecting the distribution of particles, such as a strong magnetic field over a particular area/end or subjecting part of the veil or tape to a reactant (dipping an end in, for instance) to further change the properties and/or function—this could be a useful technique to react deposited products in situ, a pathway for otherwise-too large (or difficult to process) particles to be embedded in veil or tape.

The width affected can be adjusted through the use of blocking plates, either in front of the veil or tape to block the flow of particles, or behind the veil or tape to reduce the vacuum/negative flow drawing through the veil or tape. Alternatively, a device (with appropriate/additional curtaining) could be passed over part of a veil or tape to either produce a narrow taper over veil or tape edge(s), or where a machine to process the full veil or tape size would be impractical; a large veil or tape disc could have a gradient applied if its edge was rotated through such a machine—or indeed, if the machine was sized from the centre to the disc edge, an uneven deposition would be desirable as it could provide an even coating owing to the increased travel speed at the edge.

In one example, the method comprises dispersing, redispersing and/or agitating the functional particles included in the fluid, for example continuously, for example while flowing the fluid, including the functional particles, through the veil or tape, for example ultrasonically, by stirring, using a mixer, to maintain a dispersion, for example a homogeneous dispersion, of the functional particles in the fluid.

A second aspect provides an apparatus for providing a functionalized veil or tape, comprising reinforcement fibres, for manufacture of fibre-reinforced composite parts, the apparatus comprising:

means for depositing functional particles in and/or on a veil or tape, comprising the reinforcement fibres, by flowing a fluid, including the functional particles, through the veil or tape, to provide the functionalized veil or tape.

The functionalized veil or tape, the reinforcement fibres, the fibre-reinforced composite parts, the depositing, the functional particles and/or the fluid may be as described with respect to the first aspect.

In one example, the apparatus comprises means to dispense a dispersion (such as nozzles for liquids/gasses, hoppers and/or agitators, electrostatically/-magnetically charged or otherwise, for example resonant acoustic mixing) on one face of the veil or tape.

In one example, the apparatus comprises means to affect a pressure differential through the thickness of the veil or tape through either/or pressurizing the dispensing side, with the other side a vacuum source, or ambient pressure—at least two of the three are used to maintain a difference in pressure and impart a flow to the fluid.

A third aspect provides a functionalized veil or tape, comprising reinforcement fibres, having non-uniformly deposited functional particles therein and/or thereon, for example provided according to the method of the first aspect and/or using the apparatus according to the second aspect.

The functionalized veil or tape, the reinforcement fibres, the fibre-reinforced composite parts, the depositing and/or the functional particles may be as described with respect to the first aspect.

A fourth aspect provides a method of manufacturing a fibre-reinforced composite part, for example an aircraft composite part, such as an airframe or part thereof, the method comprising:

- providing a first fibre-reinforced composite part and providing a second fibre-reinforced composite part, wherein the first fibre-reinforced composite part and the second fibre-reinforced composite part have different properties, such as electrical, thermal, magnetic and/or structural properties;
- joining the first fibre-reinforced composite part and the second fibre-reinforced composite part; and
- transitioning between the first fibre-reinforced composite part and the second fibre-reinforced composite part using a pre-impregnated tape, for example provided according to the method of the first aspect and/or using the apparatus according to the second aspect and/or according to the third aspect.

Providing the first fibre-reinforced composite part and providing the second fibre-reinforced composite part are known. Joining the first fibre-reinforced composite part and the second fibre-reinforced composite part is generally known.

In one example, joining the first fibre-reinforced composite part and the second fibre-reinforced composite part comprises joining the first fibre-reinforced composite part and the second fibre-reinforced composite part using, at least in part, the pre-impregnated tape.

A fifth aspect provides a fibre-reinforced composite part, for example an aircraft composite part, such as an airframe or part thereof, comprising a functionalized veil or tape according to the third aspect.

BRIEF DESCRIPTION OF THE FIGURES

Embodiments of the invention will now be described by way of example only with reference to the figures, in which.

DETAILED DESCRIPTION

Figure 1:
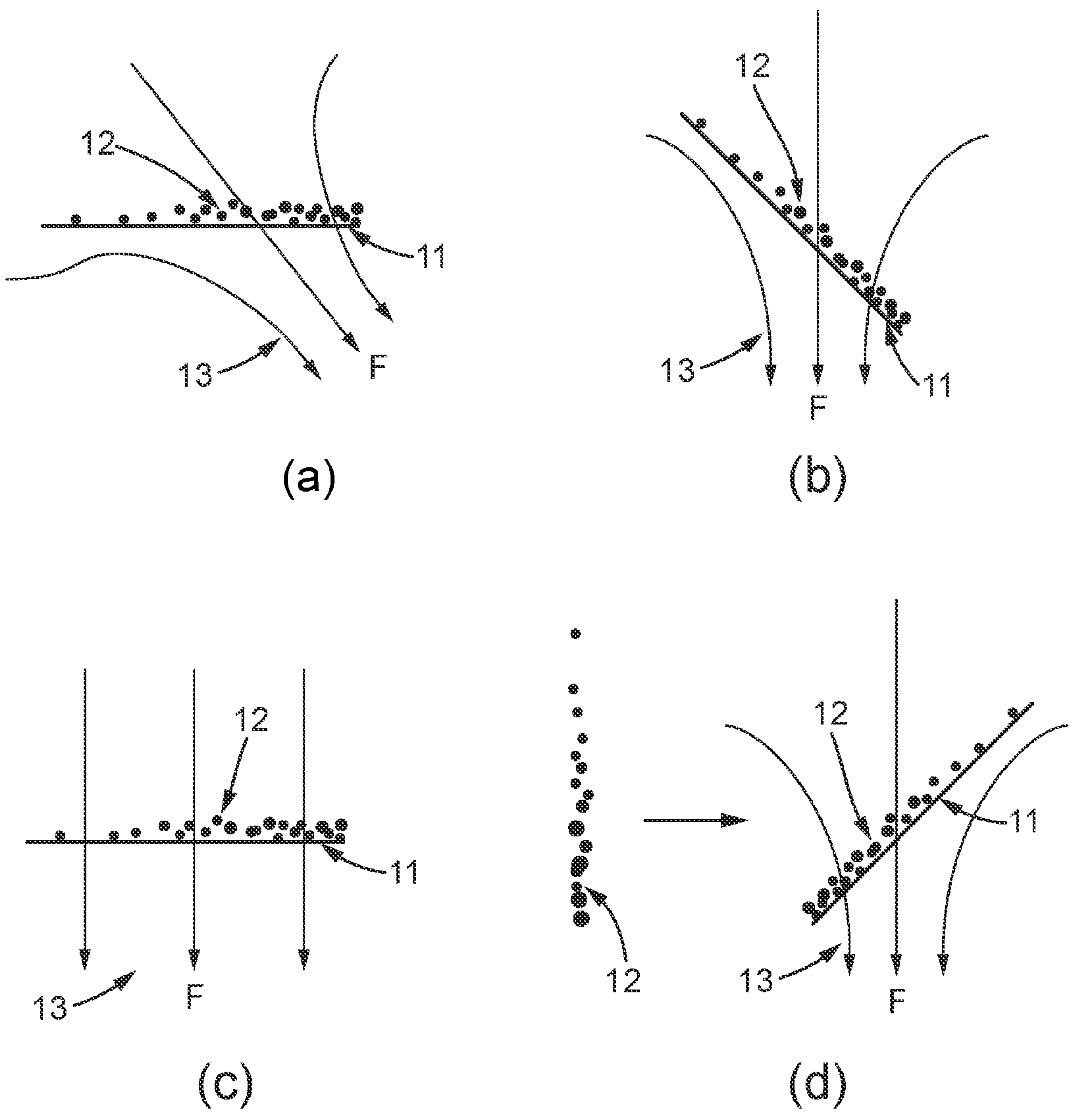
FIGS. 1(*a*) to 1(*d*) schematically depict methods according to exemplary embodiments.

FIGS. 1(*a*) to 1(*d*) schematically depict methods according to exemplary embodiments.

The methods are of providing a functionalized veil or tape, comprising reinforcement fibres, for manufacture of fibre-reinforced composite parts, the methods comprising:

- depositing functional particles 12 in and/or on a veil or tape 11, comprising the reinforcement fibres (not shown), by flowing F a fluid 13, including the functional particles 12, through the veil or tape 11, to provide the functionalized veil or tape.

In more detail, material (i.e. fluid 13, particularly a liquid in this example, including the functional particles 12) is drawn through the veils or tapes, as shown schematically in the exemplary embodiments shown in FIGS. 1(*a*) to 1(*d*), to produce an intentional spread of functional particles across the entire veil or tape width. By controlling an angle (i.e. an orientation) at which the veil or tape is brought over a pump, use is made of the pumping direction and/or gravity to assist in distributing the particles (particularly, but not limited to, colloids) towards the lower end of the veil (relative to flat). Additionally and/or alternatively, a device performing the same operation, for example a mask, may be brought over the veil or tape, and the mask maintained static or moved dynamically during the method. Suitably masks include a protrusion of a larger piece of veil or tape (useful for applying a narrower tapered width, e.g. for grounding circuit boards, taking on a visual appearance much like gilded edging).

This process may be performed by combination of a means to dispense a dispersion (such as nozzles for liquids/gasses, hoppers and/or agitators, electrostatically/-magnetically charged or otherwise) on one face of a veil or tape, and a means to affect a pressure differential through the thickness of the veil or tape through differentially pressurizing the dispensing side (such as a liquid pump or a vacuum pump on one side of the veil or tape and ambient pressure on the other side of the veil or tape to maintain a difference in pressure and impart a flow to the media).

Uses of the functionalized veil or tape provided by the method according to the first aspect could include ground planes or edges integrated into the PCB material (e.g. FR4 PCB material), particularly those where there are analog and digital circuits on the same board, distributions of conductivity intended to reduce EM interference on boards, including those intended to make a Faraday cage/enclosure or similar.

Other civilian applications include the colouration/dying and/or functionalisation of materials for cleaning products, clothing and currency.

Wipes and sponge 'mops' can be graduated with an agent, so as to deposit surfactant onto a surface at the start of the wipe/mop travel, to be absorbed in the remainder of the sponge and/or towards the end of the wipe/sponge in order to trail with a drying agent, for instance.

Clothing products can have particles embedded within them through this process, with the possibility of embedding precious metals into fine fabrics where other methods may destroy the underlying veil or tape.

Use of this technique could gild edges to impart a visual cue of significance or produce a form of security marking for currency or high value documents such as banknotes, bearer bonds, certificates, gilts, or promotional merchandise (such as golden tickets, invitations).

A (uniform) porous/semi-permeable membrane/veil can be continuously drawn across an angled pressure differential, whereby the enforced/entrained motion of particles is unevenly distributed across the width of the veil or tape. This could be performed by altering the distance and/or location of a vacuum source on one side of the veil or tape—in order to induce a stronger flow in a particular location along the width—as in FIG. 1(*a*).

Alternatively, the angle at which the veil or tape is brought over a liquid pump can be altered (as in FIG. 1(*b*)) in order to make use of the pumping direction and/or gravity to assist in distributing the particles (particularly, but not limited to, colloids) towards the lower end of the veil (relative to flat).

In both of these methods, successive plugging of pores in the veil or tape can be taken advantage of, as the veil or tape now is not uniform in its porosity/permeability (and path-through size/collective pore size/channel widths are significantly changed) and will therefore behave differently as a 'filtration medium'; this is useful for further passes of the above processes and/or depositing particles that (wouldn't plug/undesirable distribution) as the initially-processed veil or tape and its deposited particles can influence the further deposition through changing the pore characteristics (size, number-both of these affecting flow, as in FIG. 1(*c*)) as well as influences arising from the properties (or mere presence) of the deposited particles (i.e. magnetic attraction, chemical reaction, viscosity effects such as skin forming or beading—to affect surface finish, for instance). These influences could be taken advantage of for further affecting the distribution of particles, such as a strong magnetic field over a particular area/end or subjecting part of the veil or tape to a reactant (dipping an end in, for instance) to further change the properties and/or function—this could be a useful technique to react deposited products in situ, a pathway for otherwise-too large (or difficult to process) particles to be embedded in veil or tape.

The width affected can be adjusted through the use of blocking plates (i.e. a mask), either in front of the veil or tape to block the flow of particles, or behind the membrane to reduce the vacuum/negative flow drawing through the veil or tape. Alternatively and/or additionally, a device (with appropriate/additional curtaining) (i.e. a mask) could be passed over part of a veil or tape, to either produce a narrow taper over veil or tape edge(s), or where a machine to process the full veil or tape size would be impractical; a large veil or tape disc could have a gradient applied if its edge was rotated through such a machine—or indeed, if the machine was sized from the centre to the disc edge, an uneven deposition would be desirable as it could provide an even coating owing to the increased travel speed at the edge.

Figure 2:
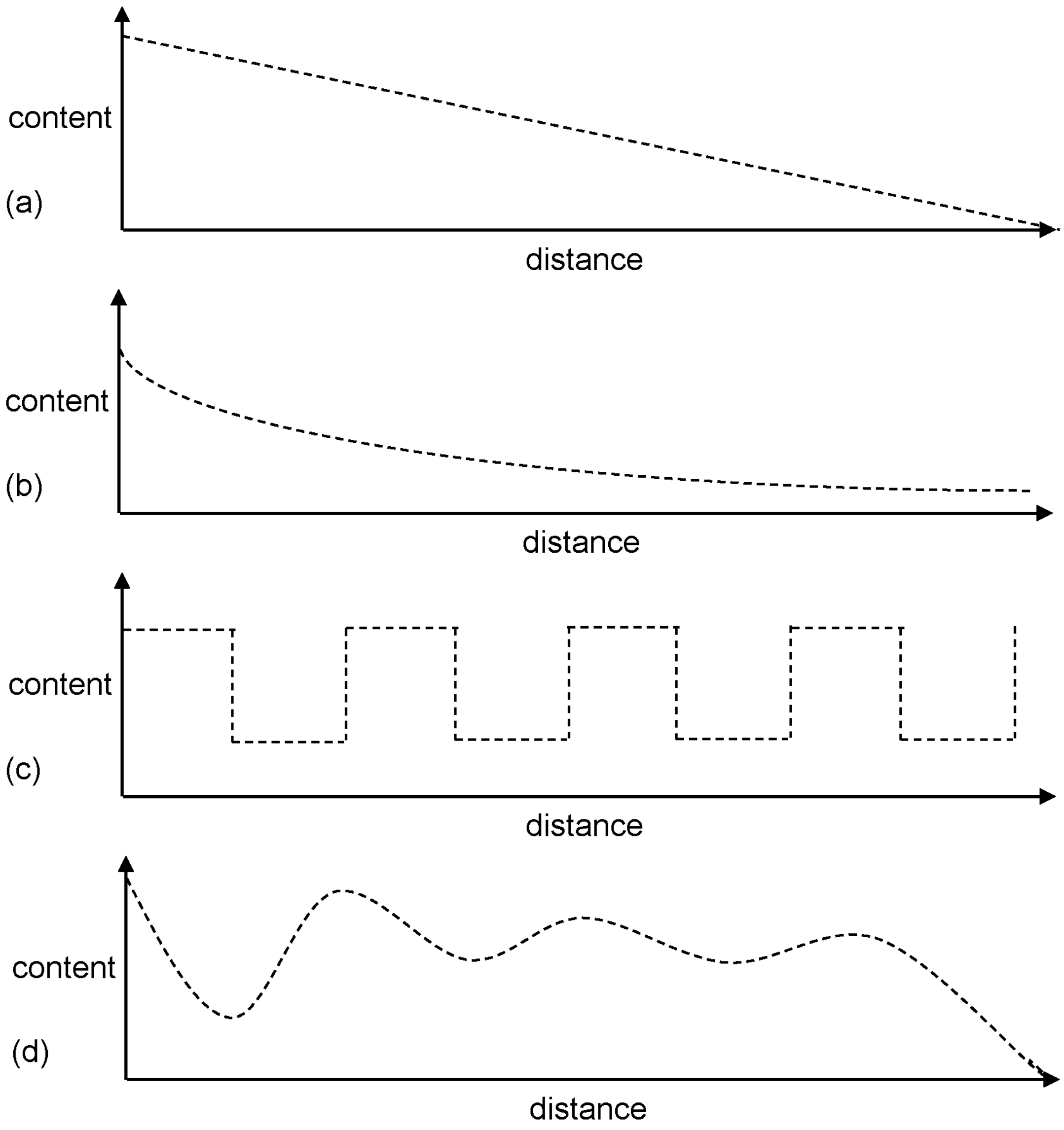
FIGS. 2(*a*) to 2(*d*) schematically depict functional particle contents of functionalized veils or tapes according to exemplary embodiments.

FIGS. 2(*a*) to 2(*d*) schematically depict functional particle contents of functionalized veils or tapes according to exemplary embodiments.

FIG. 2(*a*) schematically depicts functional particle content of a functionalized veil or tape decreasing linearly across a width of the functionalized veil or tape. In this example, the method comprises controlling an angle (i.e. an orientation) at which the veil or tape is brought over a pump, in order to make use of the pumping direction and/or gravity to assist in distributing the particles (particularly, but not limited to, colloids) towards the lower end of the veil (relative to flat). In this example, the angle is constant during the method, to provide the linearly decreasing functional particle content of the functionalized veil or tape.

FIG. 2(*b*) schematically depicts functional particle content of a functionalized veil or tape decreasing non-linearly across a width of the functionalized veil or tape. In this example, the method comprises altering an angle (i.e. an orientation) at which the veil or tape is brought over a pump or vacuum source, in order to make use of the pumping direction and/or gravity to assist in distributing the particles (particularly, but not limited to, colloids) towards the lower end of the veil (relative to flat). In this example, the angle is non-constant (i.e. changes) during the method, to provide the non-linearly decreasing functional particle content of the functionalized veil or tape.

FIG. 2(*c*) schematically depicts functional particle content of a functionalized veil or tape varying periodically across a width of the functionalized veil or tape. In this example, non-uniformly depositing the functional particles in and/or on the veil or tape comprises masking the veil or tape, to provide the periodic variation of the functional particle content of the functionalized veil or tape.

FIG. 2(*d*) schematically depicts functional particle content of a functionalized veil or tape varying aperiodically across a width of the functionalized veil or tape. In this example, non-uniformly depositing the functional particles in and/or on the veil or tape comprises masking the veil or tape and altering an angle (i.e. an orientation) at which the veil or tape is brought over a pump or vacuum source, in order to make use of the pumping direction and/or gravity to assist in distributing the particles (particularly, but not limited to, colloids) towards the lower end of the veil (relative to flat), to provide the aperiodic variation of the functional particle content of the functionalized veil or tape.

What is claimed is:

1. A method of manufacturing a functionalized veil or tape that is useful for manufacturing fibre-reinforced composite parts, the method comprising:

providing a veil or tape comprising reinforcement fibres; and causing a fluid that includes functional particles to flow through the veil or tape by pumping and/or osmotic pressure differential, thereby depositing the functional particles in and/or on the veil or tape, wherein "functional particles" refers to particles that are either functionalized before they are deposited, or can be functionalized after they are deposited;

the functional particles being non-uniformly deposited across a width and/or along a length of the veil or tape.

2. The method according to claim 1, wherein the functional particles are electrically conductive particles.

3. The method according to claim 1, wherein the reinforcement fibres are electrically insulating reinforcement fibres.

4. The method according to claim 1, wherein:

the veil comprises non-aligned and/or discontinuous reinforcement fibres; or the tape comprises aligned and/or continuous reinforcement fibres.

5. The method according to claim 1, wherein non-uniformly depositing the functional particles in and/or on the veil or tape comprises only depositing the functional particles proximate a periphery of the veil or tape.

6. The method according to claim 1, wherein non-uniformly depositing the functional particles in and/or on the veil or tape comprises masking the veil or tape.

7. The method according to claim 1, wherein depositing the functional particles in and/or on the veil or tape comprises applying a magnetic field and/or an electric field while flowing the fluid through the veil or tape.

8. The method according to claim 1, wherein depositing the functional particles in and/or on the veil or tape comprises depositing the functional particles on the reinforcement fibres and/or in pores therebetween.

9. The method according to claim 1, wherein the functional particles are deposited in and/or on the veil or tape as non-functionalized particles, and the method further comprises functionalizing the functional particles after they are deposited in and/or on the veil or tape.

10. The method according to claim 1, further comprising dispersing and/or suspending the functionalized particles in the fluid.

11. The method according to claim 1, wherein causing the fluid to flow through the veil or tape comprises orienting the veil or tape relative to the flowing fluid such that the functional particles are non-uniformly deposited across a width and/or along a length of the veil or tape.

* * * * *